(12) United States Patent
Silvey et al.

(10) Patent No.: US 11,385,041 B2
(45) Date of Patent: Jul. 12, 2022

(54) FIXTURING APPARATUS

(71) Applicant: RENISHAW PLC, Wotton-Under-Edge (GB)

(72) Inventors: Thomas Nigel James Silvey, Nailsworth (GB); Ian David Stroud, Nailsworth (GB)

(73) Assignee: RENISHAW PLC, Wotton-Under-Edge (GB)

( * ) Notice: Subject to any disclaimer, the term of this patent is extended or adjusted under 35 U.S.C. 154(b) by 329 days.

(21) Appl. No.: 16/648,892

(22) PCT Filed: Oct. 16, 2018

(86) PCT No.: PCT/GB2018/052979
§ 371 (c)(1),
(2) Date: Mar. 19, 2020

(87) PCT Pub. No.: WO2019/077337
PCT Pub. Date: Apr. 25, 2019

(65) Prior Publication Data
US 2020/0225018 A1    Jul. 16, 2020

(30) Foreign Application Priority Data

Oct. 19, 2017 (EP) .................................. 17197362

(51) Int. Cl.
*B23Q 16/00* (2006.01)
*G01B 5/00* (2006.01)
(Continued)

(52) U.S. Cl.
CPC ........... *G01B 5/0002* (2013.01); *B65G 49/06* (2013.01); *G01B 7/004* (2013.01)

(58) Field of Classification Search
CPC ... G01B 5/0002; G01B 5/0004; G01B 5/0007
(Continued)

(56) References Cited

U.S. PATENT DOCUMENTS 4,848,005 A * 7/1989 Ercole .................. G01B 5/0002
33/549
5,026,033 A * 6/1991 Roxy ..................... B23Q 3/103
269/45
(Continued)

FOREIGN PATENT DOCUMENTS

CN    201685121 U    12/2010
CN    203956536 U    11/2014
(Continued)

OTHER PUBLICATIONS

"Renishaw Fixtures: Your Single Source for Metrology Fixturing" Renishaw Apply Innovation, Part No. H-1000-7583-02, Feb. 14, 2013, pp. 1-8.
(Continued)

*Primary Examiner* — George B Bennett
(74) *Attorney, Agent, or Firm* — Oliff PLC

(57) ABSTRACT

A fixturing apparatus is described that can be used with metrology apparatus, such as coordinate measuring machines, flexible gauges and the like. The fixturing apparatus has a base and a plurality of supports extending from the base that are configured to retain an object. At least one of the plurality of supports comprises a floating support having a floating support element that is moveable relative to the base upon contact with an object being loaded into the fixture. A locking mechanism, such as a pneumatic locking mechanism, is provided that can be actuated to immobilise each floating support element relative to the base. The object may have a glass sheet. A corresponding method of fixturing an object is also described.

15 Claims, 5 Drawing Sheets

(51) Int. Cl.
*B65G 49/06* (2006.01)
*G01B 7/004* (2006.01)

(58) Field of Classification Search
USPC .................................................. 33/568, 573
See application file for complete search history.

(56) References Cited

U.S. PATENT DOCUMENTS

| | | | | |
|---|---|---|---|---|
| 5,481,811 A | * | 1/1996 | Smith | B25B 31/005 |
| | | | | 33/573 |
| 5,625,959 A | * | 5/1997 | Ercole | G01B 5/0002 |
| | | | | 33/573 |
| 5,829,151 A | * | 11/1998 | Collier | B23Q 7/14 |
| | | | | 33/549 |
| 8,167,290 B2 | * | 5/2012 | Lauzier | B65D 19/0002 |
| | | | | 269/72 |
| 9,090,230 B2 | * | 7/2015 | Henblad | G01B 5/25 |
| 2012/0053891 A1 | | 3/2012 | Abbott, III et al. | |
| 2022/0082365 A1 | * | 3/2022 | Verduin | G01B 5/0004 |

FOREIGN PATENT DOCUMENTS

| | | |
|---|---|---|
| CN | 105234688 A | 1/2016 |
| CN | 106976011 A | 7/2017 |
| JP | 2000-007146 A | 1/2000 |

OTHER PUBLICATIONS

Dec. 11, 2018 International Search Report issued in International Patent Application No. PCT/GB2018/052979.

Dec. 11, 2018 Written Opinion of the International Searching Authority issued in International Patent Application No. PCT/GB2018/052979.

* cited by examiner

FIXTURING APPARATUS

The present invention relates to fixturing apparatus for holding a component during inspection and in particular to fixturing apparatus suitable for retaining a flexible component.

It is known to inspect or measure objects using metrology apparatus, such as coordinate measuring machines, robots, etc. It is also known to provide fixturing apparatus that holds the object that is to be inspected in a defined location and orientation on the bed of the metrology apparatus to enable it to be measured. Reconfigurable metrology fixtures comprise a plate or base that typically includes an array of threaded holes. A range of different supporting elements can be attached to the threaded holes at various locations on the plate to construct a fixture that is suitable for holding the object to be inspected. The supporting elements that are attached to the plate may be manually adjustable. For example, they may be extended, retracted and rotated before being secured in place for use. The supporting elements may also include arms that can be manually moved to hold an object in place after it has been loaded into the fixture. Once a particular fixture arrangement has been configured, it may then be used to hold a series of nominally identical objects that are to be inspected by the metrology apparatus. Bespoke fixturing apparatus is also known that is configured to only hold parts of a certain type.

Known fixturing solutions are adequate for the majority of situations, such as aerospace, automotive, electronics, industrial and medical applications. If fixturing large metal parts, such as engine or aerospace components, it is relatively simple to hold such parts firmly without applying enough force to distort or damage the part. However, for smaller or more flexible objects it is necessary to limit the force applied to the object by the fixture to prevent distortions of the object that could degrade measurement accuracy. This is especially the case when a flexible part is measured using a contact measurement process in which the stylus tip of a measurement probe is pressed into contact with the object held by the fixture. To date, no practical solution has been found that allows certain flexible components (e.g. thin glass components) to be held without being distorted from their free state whilst also providing sufficient support to allow contact measurements to be taken across the component without such measurements causing distortion of the component.

According to a first aspect of the present invention there is provided a fixturing apparatus, the fixturing apparatus comprising a base and a plurality of supports extending from the base that are configured to retain an object, characterised in that at least one of the plurality of supports comprises a floating support, the floating support comprising a floating support element that is moveable relative to the base upon contact with an object being loaded into the fixturing apparatus and a locking mechanism that can be actuated to immobilise the floating support element relative to the base.

The present invention thus relates to fixturing apparatus that may be used to hold an object for inspection by metrology apparatus or the like. The fixturing apparatus (or "fixture" for short) comprises a base and a plurality of supports extending from the base that are configured to retain an object. At least one of the plurality of supports comprises a floating support which includes a floating support element that is moveable relative to the base upon contact with an object being loaded into the fixturing apparatus. In other words, each floating support includes a floating or moveable support element that, in its free or unlocked state, can be moved (e.g. pushed towards the base) by contact with an object that is being loaded into the fixturing apparatus. Each floating support also includes a locking mechanism that can be actuated to immobilise the floating support element relative to the base. In other words, each floating or moveable support element can adopt a locked state in which it is immobilised (i.e. locked in position) relative to the base.

The fixturing apparatus of the present invention, in particular the provision of one or more floating supports, enables objects to be held in their free-state (undistorted) form. During insertion of the object into the fixture, each floating support element simply moves when it makes contact with the object. The floating support(s) thus conform to the shape of the object without causing any distortion of the object. Once the object has been fully inserted into the fixture, the locking mechanism of each floating support can be actuated to immobilise each floating support element. The floating supports, in their locked state, will then provide mechanical support to the object being held in the fixturing apparatus. This additional support of the object that is provided by the (locked) floating support elements reduces the amount of object distortion that occurs when the object is, for example, measured by bringing a measurement probe into contact with its surface. The fixturing apparatus of the present invention thus allows components (e.g. flexible objects such as thin glass components) to be held without being distorted from their free state whilst also providing sufficient support to allow contact measurements to be taken across the component without such measurements themselves causing distortion (e.g. bending) of the component.

The fixturing apparatus may comprise one or more supports other than the floating supports. Advantageously, at least one of the plurality of supports comprises a fixed support. Preferably, a plurality of fixed supports are provided. For example, at least three fixed supports may be provided. Each fixed support preferably comprises a fixed support element having an invariant position relative to the base. In other words, each fixed support element may comprise a protrusion, such as a pillar or post, that extends from the base towards the region in which the object is to be held by the fixturing apparatus. It should be noted that a fixed support element may be permanently attached to the base; e.g. it may be formed integrally with the base or permanently attached (e.g. welded) to the base. Alternatively, each fixed support element may be detachable from the base (e.g. it may be screwed into the base).

Advantageously, at least one of the plurality of supports comprises a biasing support. Each biasing support preferably comprises a support element and a biasing device for biasing the support element. Conveniently, the plurality of supports comprises at least one fixed support and at least one biasing support. The biasing device of each biasing support may then bias the respective support element towards a fixed support(s). The biasing support preferably does not include a locking mechanism (i.e. so the biasing force is maintained, in use, to hold the object in the fixture). The biasing force applied by at least one biasing support may be parallel to a plane of the base. In other words, the biasing support may act to laterally move the object into a defined position by pushing it into engagement with a plurality of fixed supports. A plurality of additional fixed supports may also be provided to support the underside of the object.

Advantageously, the at least one fixed support and the at least one biasing support are configured to provide no more than a single constraint of each of the six degrees of freedom of movement of the object. In this manner, the object is constrained so as not to move, but it is not over-constrained.

This prevents the fixture imparting forces that cause the object to be distorted or deformed in some way. The skilled person would appreciate the various configurations of supports that could be provided.

Conveniently, the plurality of supports comprises a plurality of floating supports. As explained above, each floating support comprises a floating support element and a locking mechanism that can immobilise (i.e. lock in place) the floating support element. Advantageously, each floating support includes a biasing device. The biasing device may comprise a spring or similar biasing element. The biasing device, when the actuator is unlocked, preferably biases the floating support element towards the region in which the object will be retained. In other words, each floating support element may be biased towards the object. Conveniently, the biasing force applied by each biasing device is sufficient for the floating support element to reach a fully extended state in the absence of an object being retained by the fixturing apparatus. The biasing force is preferably light enough to allow the floating support element to move when light pressure is applied. Conveniently, the biasing force applied by each biasing device is sufficiently low to allow the biased floating support element to retract upon contact with the object without causing any substantial distortion of the object.

Each floating support comprises a locking mechanism for immobilising the floating support element relative to the base. The locking mechanism is preferably automatically actuatable, for example under the control of a computer controller. If a plurality of floating supports are provided, the locking mechanism of each floating support may be controlled separately. Alternative, the locking mechanisms of all of a plurality of floating supports may be linked so they are activated simultaneously on receipt of an appropriate control instruction. Advantageously, the locking mechanism comprises a pneumatic actuator for immobilising the floating support element relative to the base. In this manner, a supply of compressed air can be controlled to lock and unlock the pneumatic actuator(s). Such a compressed air supply, that can be turned on and off as required to lock and unlock the locking mechanism(s), is often available in workshops and production facilities. An associated computer controller (e.g. of a metrology apparatus) may be arranged to turn the compressed air supply on and off as required. Alternatively, the locking mechanism could comprise an electrical actuator (e.g. a piezo-resistive element, electro-magnet etc). In fact, any type of locking mechanism could be provided.

Each of the floating supports advantageously provide, when the actuator is locked, additional mechanical support to the object. In other words, the locked floating support element(s) engage and help support the object. This additional mechanical support may be provided during contact between the object and an associated inspection device. In particular, the additional mechanical support that is provided may prevent distortions of the object that would otherwise occur when it is being measured (e.g. using a measurement probe having a deflectable stylus that is pressed into contact with the object during measurement). The floating supports may be located to provide additional support to specific areas of the object to be held by the fixturing apparatus. For example, the additional support may be provided near to edges or critical features of the object that are not sufficiently supported by other (e.g. fixed) supports. Alternatively, the floating supports may be provided in clusters to support objects having non-uniform or complex surfaces. For example, the apparatus could be used to support custom or bespoke articles, such as custom-made medical implants, plates or joints.

Advantageously, the plurality of supports are releasably attachable to the base thereby allowing the configuration of the fixturing apparatus to be adjusted for different objects that are to be retained thereby. In other words, the apparatus may be a reconfigurable fixture in which at least some of the various supports can be repositioned relative to the base (e.g. to hold different objects). Alternatively, the plurality of supports are provided at fixed locations on the base. In this manner, a custom fixture for a part, or range of similar parts, may be provided. Advantageously, the fixture is for holding a component of a consumer electronics item for inspection. For example, a glass screen or cover of a cellular telephone.

The fixturing apparatus of the present invention may be used for a variety of purposes. Conveniently, the fixturing apparatus is used to hold an object during an inspection process (e.g. using a measurement probe having a stylus that it brought into contact with the object). Metrology apparatus may thus be provided that comprises the fixturing apparatus described above. The metrology apparatus may comprise a measurement probe that can be moved relative to an object to be measured being held by the fixturing apparatus. The measurement probe may comprise a deflectable stylus for contacting the object. The measurement probe may be a touch trigger probe. The measurement probe may be a scanning probe. The metrology apparatus may also include a handling system (e.g. a robot) for loading the object into, and taking it out of, the fixturing apparatus.

A second aspect of the invention comprises a method for retaining an object using a fixturing apparatus comprising a plurality of supports extending from a base, characterised by at least one of the plurality of supports being a floating support comprising a floating support element and a locking mechanism, the method comprising the steps of (i) placing an object in a predefined location in the fixturing apparatus, the object engaging and moving the floating support element during the placement in the defined location, and (ii) actuating the locking mechanism of each floating support to immobilise the floating support element relative to the base. The method may include any of the features described above for the corresponding apparatus.

The invention will now be described, by way of example only, with reference to the accompanying drawings in which.

Figure 1:
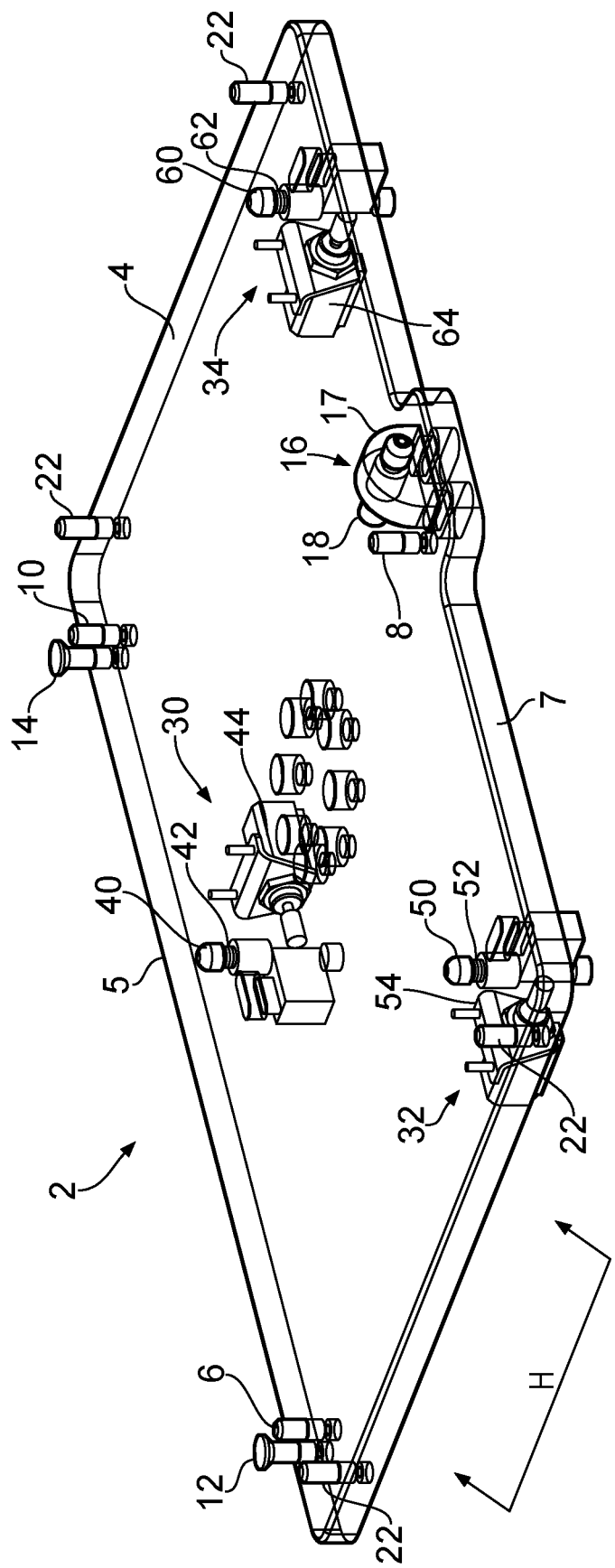
FIG. 1 is a perspective view of fixturing apparatus of the present invention.

FIG. 1 illustrates fixturing apparatus 2 of the present invention. The apparatus comprises a base 4 which, in this embodiment, is a plate of Aluminium having a generally rectangular shape. The base 4 is dimensioned to be slightly larger than a generally rectangular piece of glass (not shown in FIG. 1) that it is intended to retain during a contact-based inspection procedure.

The base 4 has a plurality of supports that extend upwardly from the base 4. The supports include a first fixed support element 6, a second fixed support element 8 and a third fixed support element 10. The first and third fixed support elements 6 and 10 are located on a first long side 5 of the rectangular base 4 near opposed corners, whilst the second fixed support element 8 is located approximately halfway along the second long side 7 of the base 4. The first, second and third fixed support elements 6, 8 and 10 are thus spaced apart in a triangular relationship and are configured to support a sheet of glass that is placed on top of them.

The base 4 also include a fourth fixed support element 12 and a fifth fixed support element 14 located on the first long side 5 of the rectangular base 4. A biasing support 16 is also provided midway along the second long side 7 of the base 4. The biasing support 16 includes a casing 17 that extends upwardly from the base 4 and a support element 18 retained by the casing 17 in such a manner that it is moveable back and forth in a direction parallel to the base 4. A spring 20 (not visible in FIG. 1) acts as a biasing device to bias the support element 18 inwardly (i.e. towards the centre of the base 4). The fourth and fifth fixed support elements 12 and 14 and the biased support element 18 extend slightly further from the base 4 than the first, second and third fixed support elements 6, 8 and 10. A sheet of glass placed on top of the first, second and third fixed support elements 6, 8 and 10 will thus be pushed by the biased support element 18 into contact with the fourth and fifth fixed support elements 12 and 14. The biasing force applied by the spring 20 is in the plane of the glass sheet to be held by the fixturing apparatus and the magnitude of the biasing force is selected to ensure the glass sheet does not distort. A plurality of locating elements 22 are also provided on the short edges of the rectangular base 4 to ensure the glass sheet is placed centrally on the base.

The fixturing apparatus 2 also comprises a first floating support 30, a second floating support 32 and a third floating support 34. The first floating support 30 comprises a first floating support element 40 and a first spring 42 for lightly biasing the first floating support element 40 upwards (i.e. away from the base 4). The first floating support 30 also includes a first pneumatic locking mechanism 44 (shown underneath the base 4 in FIG. 1) that, when actuated by a supply of compressed air, can engage the first floating support element 40 and lock it in place (i.e. to prevent movement of the first floating support element 40 relative to the base 4). The second floating support 32 comprises a second floating support element 50, a second spring 52 and a second pneumatic locking mechanism 54. The third floating support 34 comprises a third floating support element 60, a third spring 62 and a third pneumatic locking mechanism 64. The second and third floating supports 32 and 34 operate in the same manner as the first floating support 30. The first, second and third floating supports 30, 32 and 34 are spaced apart in a triangular arrangement that complements the triangular arrangement of the first, second and third fixed support elements 6, 8 and 10.

Figure 2:
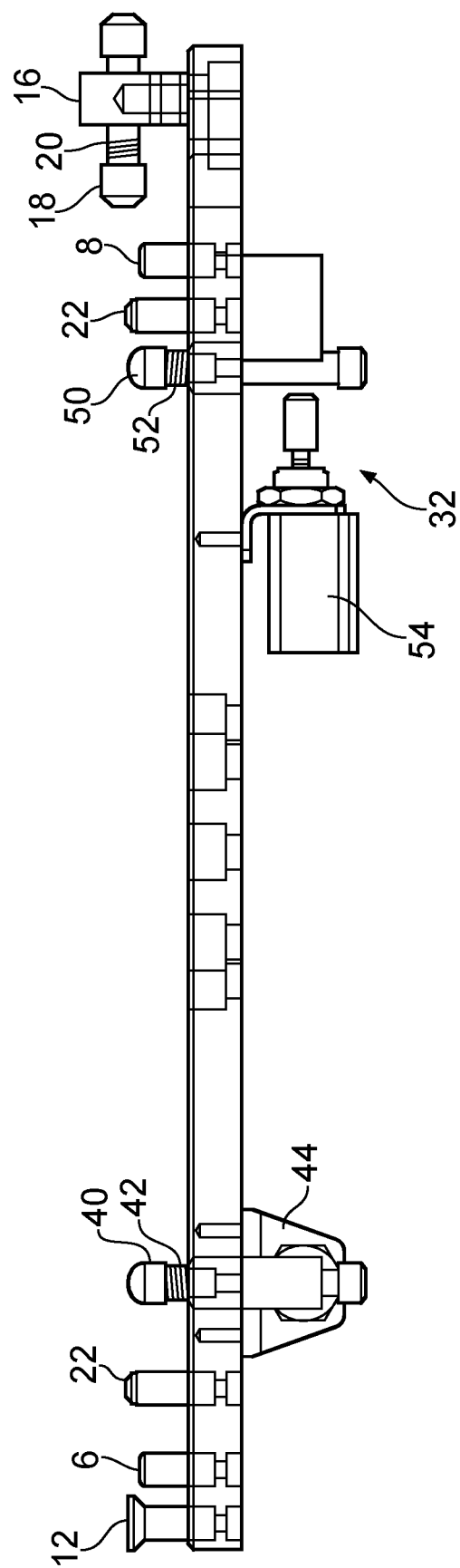
FIG. 2 is a side view of the apparatus of FIG. 1.
Figure 3:
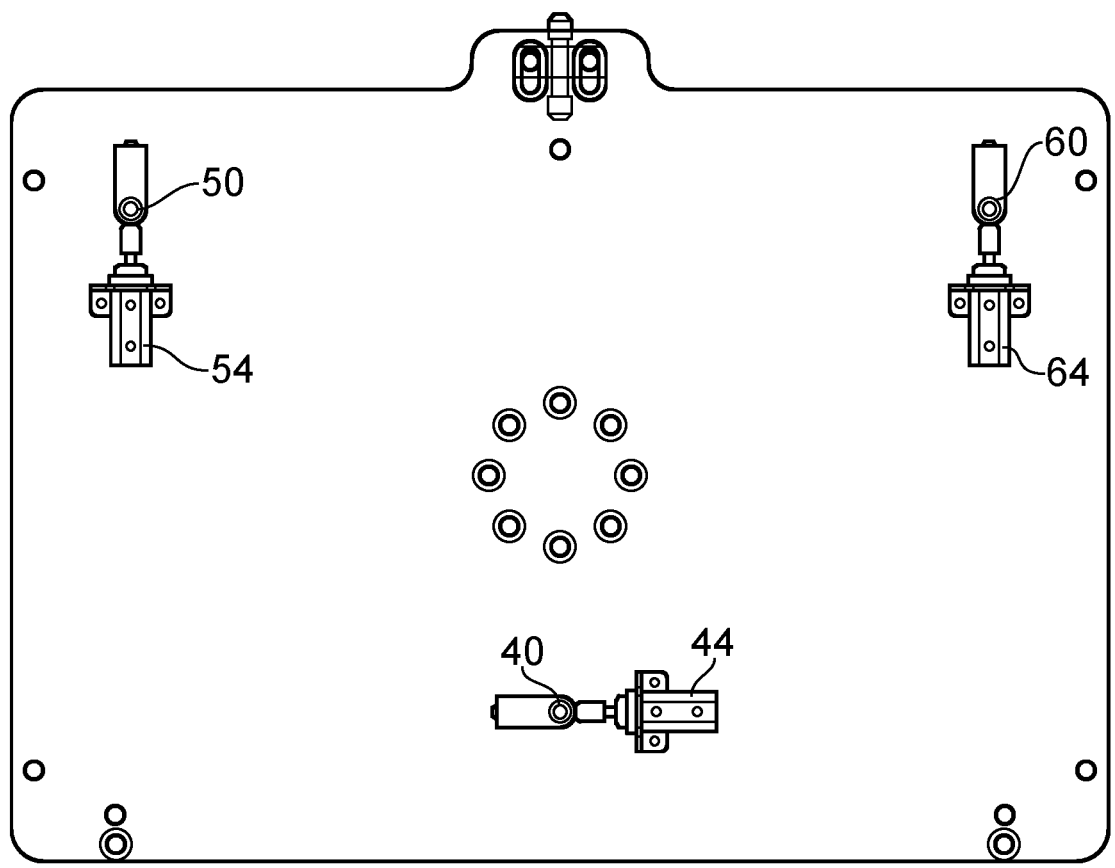
FIG. 3 is a view of the underside of the apparatus of FIG. 1.

FIG. 2 is a side view of the fixturing apparatus shown in FIG. 1 from the direction I. FIG. 3 is a view of the underside of the fixturing apparatus shown in FIG. 1. The various figures share common reference numerals.

Figure 4:
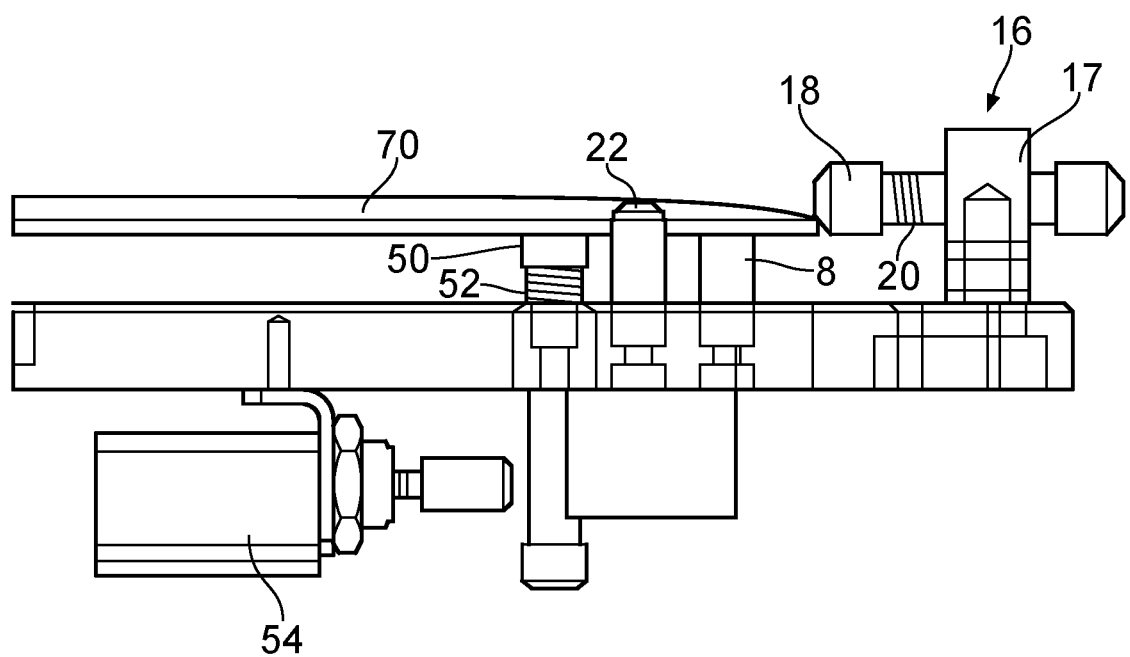
FIG. 4 is an expanded side view of the floating pins of FIG. 1.
Figure 5:
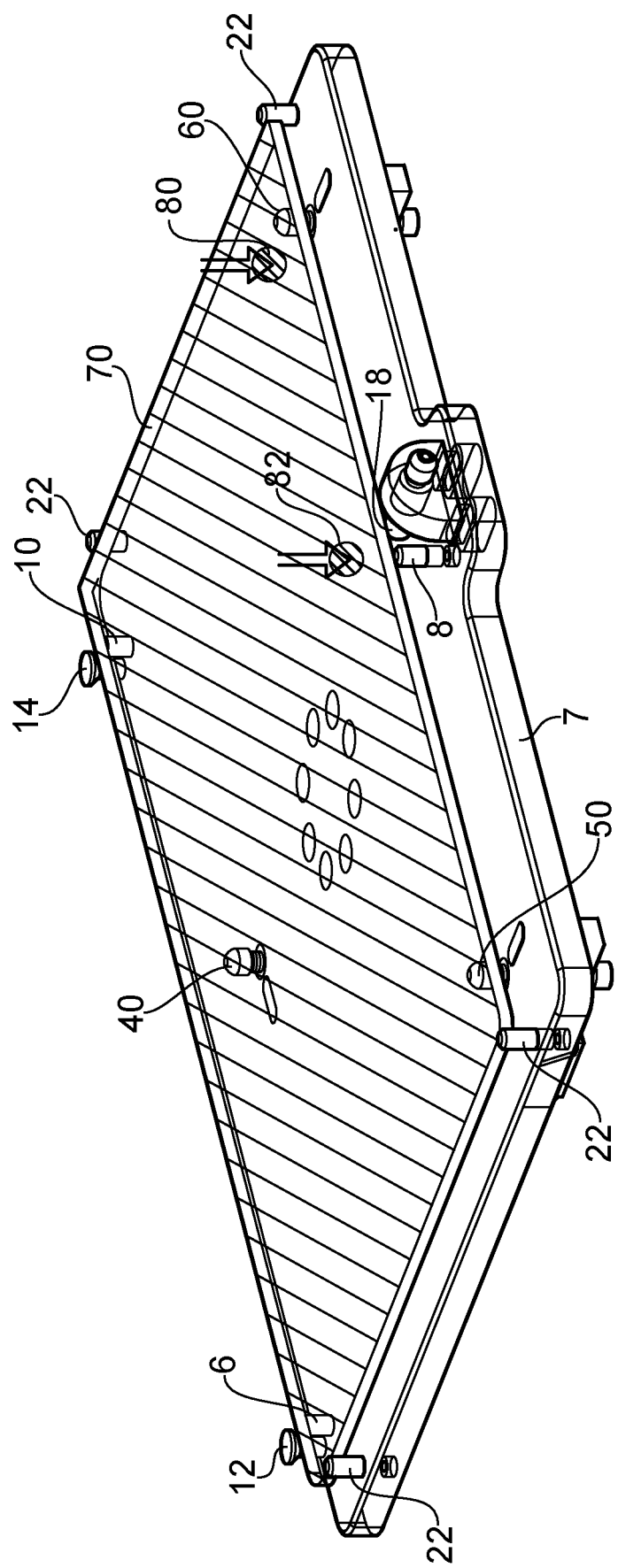
FIG. 5 shows is a top view of a glass component supported by the fixturing apparatus of FIGS. 1 to 4.

Referring additionally to FIGS. 4 and 5, the use of the fixturing apparatus to retain a glass sheet 70 is described. In use, the glass sheet 70 is secured in the fixturing apparatus in the following manner. The support element 18 is retracted by pulling it away from the base 4. The glass sheet is then placed on top of the first, second and third fixed support elements 6, 8 and 10 within the lateral region defined by the locating elements 22, the fourth and fifth fixed support elements 12 and 14 and the biased support element 18. At this point in the fixturing procedure, the first, second and third floating support elements 40, 50 and 60 are lightly biased away from the base 4 but are moveable (i.e. the first, second and third pneumatic locking mechanisms 44, 54 and 64 are deactivated). The glass sheet 70 when placed on top of the first, second and third fixed support elements 6, 8 and 10 engages the first, second and third floating support elements 40, 50 and 60 and pushes them back towards the base 4. The biasing force applied by the springs of the first, second and third floating supports 30, 32 and 34 is sufficiently light that no substantial deflection of the glass sheet 70 occurs when moving the floating support elements. The retraction of the biased support element 18 is then reversed, which causes the support element 18 to push the glass sheet 70 into engagement with the opposed fourth and fifth fixed support elements 12 and 14. In this manner, the glass sheet 70 is held in place by the fixturing apparatus without being distorted or over-constrained. This is shown in FIGS. 4 and 5.

The application of a downward force to the glass sheet 70 by a measuring device could cause distortion of the glass sheet 70 if it only rested on top of the first, second and third fixed support elements 6, 8 and 10. The amount of bending would depend on where the force was applied to the glass sheet 70. For example, application of force to the point 80 shown in FIG. 5 could cause the corner of the glass sheet to bend. However, application of the same magnitude of force to the point 82 (which is close to the second fixed support element 8) would be unlikely to cause any noticeable bending. The first, second and third floating support elements 40, 50 and 60 are located so as to provide additional support to the glass sheet. Therefore, after the glass sheet has been placed in the fixture, the first, second and third floating support elements 40, 50 and 60 are locked. In other words, the first, second and third pneumatic locking mechanisms 44, 54 and 64 are activated in order to lock the first, second and third floating support elements 40, 50 and 60 in position relative to the base. As explained above, the first, second and third floating support elements 40, 50 and 60 have previously contacted the glass sheet and have been pushed towards the base 4 by the glass sheet. The first, second and third floating support elements 40, 50 and 60 thus provide additional support to the underside of the glass sheet 70 when they are locked, but without imparting any distorting forces to the glass sheet 70.

It can thus be seen that the fixturing apparatus described above allows additional support of the glass sheet 70 during a contact-based inspection process but without over-constraining or distorting the glass sheet 70. In particular, after the first, second and third floating support elements are locked the glass sheet 70 is supported on its underside at six locations. A contact-scanning probe supported by a CMM can thus be driven into contact with the glass sheet 70 or scanned along the edge of the glass sheet 70 without the applied measurement force causing any substantial distortion of the glass sheet.

Figure 6:
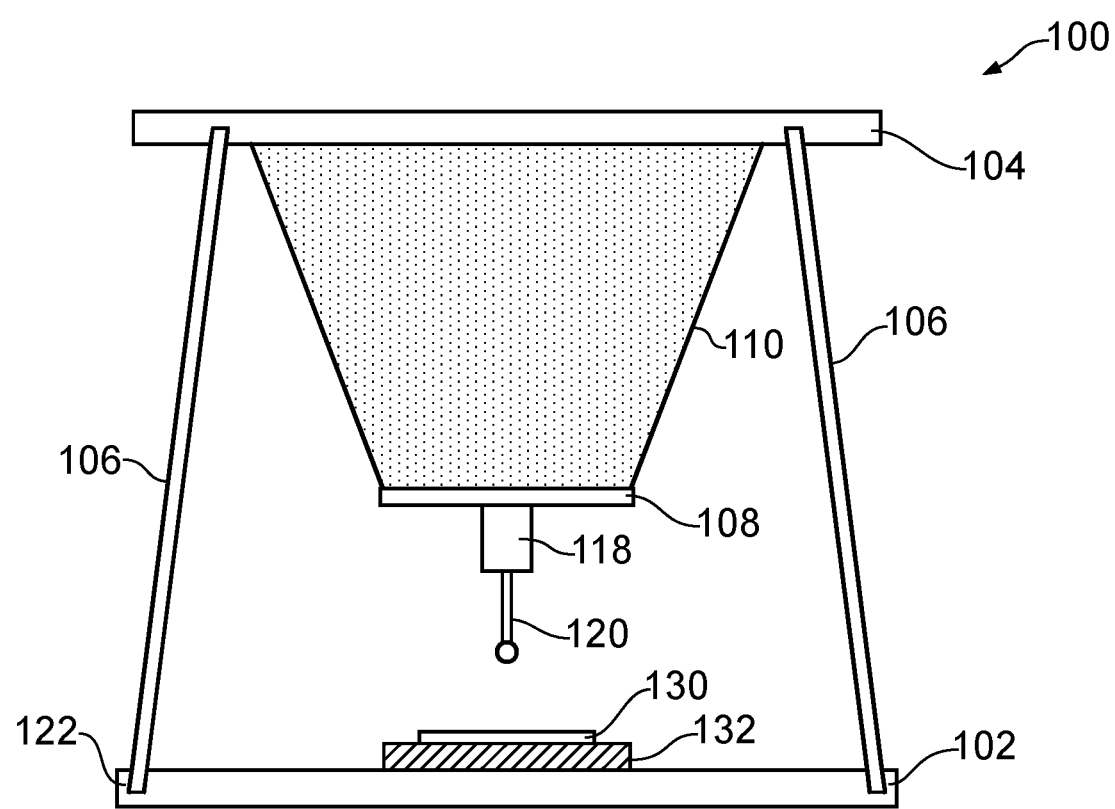
FIG. 6 illustrates the fixturing apparatus mounted on the bed of a coordinate measuring machine.

FIG. 6 schematically illustrates a flexible gauge 100 with which the above described fixturing apparatus can be used. The flexible gauge in this example is an "Equator" device sold by Renishaw plc, Wotton-Under-Edge, Gloucestershire, UK but any type of metrology apparatus (e.g. a conventional CMM etc) could be used.

The flexible gauge comprises a bed 102 fixed to an upper or base platform 104 by a plurality of support struts 106. The support struts 106 are sufficiently rigid to ensure the base platform 104 is held in a fixed position relative to the bed 102. The base platform 104 is also attached to a moveable platform 108 by a constrained parallel positioning mechanism 110. The base platform 104, moveable platform 108 and parallel positioning mechanism 110 thus form a constrained parallel positioning machine that controls translational movement of the moveable platform 108 along three axes (X,Y,Z).

The moveable platform 108 carries a measurement probe 118 having a deflectable stylus 120. A sheet of glass 130 is shown retained by fixturing apparatus 132 of the type described with reference to FIGS. 1 to 5 above. The fixturing apparatus 132 is fixed to the bed 102. A computer controller 122 is provided for controlling operation of the apparatus, in particular for controlling motion of the moveable platform 108 and for receiving measurement data from the measurement probe 118. The measurement probe 118 may be an SP25 probe as also sold by Renishaw plc, Wotton-under-Edge, Gloucestershire, UK. The SP25 measurement probe is a so-called scanning probe or analogue probe that outputs measurements of stylus tip deflection in its local coordinate system. The probe 118 is moved (i.e. by movement of the moveable platform 108) so that the stylus tip traces a path around the edge of the glass sheet 130. The controller 122 receives stylus tip deflection data from the measurement probe 118 and data from the parallel coordinate positioning apparatus relating to the position of the measurement probe. These data are combined to enable the position of multiple points on the surface of the part to be found in the machine coordinate system (i.e. relative to a fixed point or origin of the machine). These points may then be compared to previously acquired reference (master) points to ascertain if the sheet of glass 130 has been manufactured within desired tolerances.

It should be remembered that the above are merely exemplary embodiments of the present invention and that the skilled person would appreciate various modification to the fixturing apparatus would be possible. For example, although fixturing apparatus is shown for holding a rectangular glass sheet, it would also be possible to hold object of different shapes made from different materials. The number, spacing and arrangement of floating, fixed and/or biasing supports could also be adapted for different objects and different measuring objectives. Although described above for retaining an object during inspection, the fixturing apparatus could also be used to retain an object for different purposes (e.g. machining, polishing, imaging etc).

The invention claimed is:

1. A fixturing apparatus, comprising a base and a plurality of supports extending from the base that are configured to retain an object, characterised in that at least one of the plurality of supports comprises a floating support, the floating support comprising a floating support element that is moveable relative to the base upon contact with an object being loaded into the fixturing apparatus and a locking mechanism that can be actuated to immobilise the floating support element relative to the base.

2. An apparatus according to claim 1, wherein at least one of the plurality of supports comprises a fixed support, each fixed support comprising a fixed support element having an invariant position relative to the base.

3. An apparatus according to claim 2, comprising a plurality of fixed supports.

4. An apparatus according to claim 2, wherein at least one of the plurality of supports comprises a biasing support, each biasing support comprising a support element and a biasing device for biasing the support element towards at least one fixed support.

5. An apparatus according to claim 4, wherein the at least one fixed support and the at least one biasing support are configured to provide no more than a single constraint of each of the six degrees of freedom of movement of the object.

6. An apparatus according to claim 1, wherein the plurality of supports comprises a plurality of floating supports.

7. An apparatus according to claim 1, wherein each floating support includes a biasing device that, when the actuator is unlocked, biases the floating support element towards the region in which the object will be retained.

8. An apparatus according to claim 7, wherein the biasing force applied by each biasing device is sufficient for the floating support element to reach a fully extended state in the absence of an object being retained by the fixturing apparatus.

9. An apparatus according to claim 7, wherein the biasing force applied by each biasing device is sufficiently low to allow the biased floating support element to retract upon contact with the object without causing any substantial distortion of the object.

10. An apparatus according to claim 1, wherein the locking mechanism comprises a pneumatic actuator for immobilising the floating support element relative to the base.

11. An apparatus according to claim 1, wherein each of the floating supports provide, when the actuator is locked, additional mechanical support to the object during contact with an associated inspection device.

12. An apparatus according to claim 1, wherein the plurality of supports are releasably attachable to the base thereby allowing the configuration of the fixturing apparatus to be adjusted for different objects that are to be retained thereby.

13. An apparatus according to claim 1, wherein the plurality of supports are provided at fixed locations on the base.

14. Metrology apparatus comprising a measurement probe that can be moved relative to an object to be measured, the apparatus further comprising a fixturing apparatus according to claim 1.

15. A method for retaining an object using a fixturing apparatus comprising a plurality of supports extending from a base, wherein at least one of the plurality of supports being a floating support comprising a floating support element and a locking mechanism, the method comprising the steps of (i) placing an object in a predefined location in the fixturing apparatus, the object engaging and moving the floating support element during the placement in the defined location, and (ii) actuating the locking mechanism of each floating support to immobilise the floating support element relative to the base.

* * * * *